United States Patent
Qi et al.

(10) Patent No.: US 9,840,605 B2
(45) Date of Patent: Dec. 12, 2017

(54) FLAME-RETARDANT COPOLYMERS OF DIALKYL (METH)ACRYLOYLOXYALKYL PHOSPHATE OR DIALKYL (METH)ACRYLOYLOXYALKYL PHOSPHONATE MONOMERS AND POLYMER FOAMS BASED MADE THEREFROM

(71) Applicants: DOW GLOBAL TECHNOLOGIES LLC, Midland, MI (US); Yudong Qi, Shanghai (CN); Yan Li, Shanghai (CN); Shana P. Bunker, Midland, MI (US); Stephane Costeux, Midland, MI (US); Ted A. Morgan, Midland, MI (US)

(72) Inventors: Yudong Qi, Shanghai (CN); Yan Li, Shanghai (CN); Shana P. Bunker, Midland, MI (US); Stephane Costeux, Midland, MI (US); Ted A. Morgan, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/100,956

(22) PCT Filed: Dec. 27, 2013

(86) PCT No.: PCT/CN2013/090689
§ 371 (c)(1),
(2) Date: Jun. 1, 2016

(87) PCT Pub. No.: WO2015/096127
PCT Pub. Date: Jul. 2, 2015

(65) Prior Publication Data
US 2016/0304692 A1    Oct. 20, 2016

(51) Int. Cl.
*C08J 9/12* (2006.01)
*C09K 21/14* (2006.01)
*C08F 220/14* (2006.01)
*C08J 9/00* (2006.01)
*C08F 220/00* (2006.01)

(52) U.S. Cl.
CPC ............ *C08J 9/122* (2013.01); *C08F 220/14* (2013.01); *C08J 9/0061* (2013.01); *C08J 9/12* (2013.01); *C09K 21/14* (2013.01); *C08J 2201/032* (2013.01); *C08J 2203/06* (2013.01); *C08J 2203/08* (2013.01); *C08J 2205/042* (2013.01); *C08J 2205/044* (2013.01); *C08J 2333/10* (2013.01); *C08J 2333/12* (2013.01); *C08J 2343/00* (2013.01); *C08J 2433/12* (2013.01)

(58) Field of Classification Search
CPC ...................................................... C08J 9/122
USPC .......................................................... 521/64
See application file for complete search history.

(56) References Cited

U.S. PATENT DOCUMENTS

2012/0178842 A1    7/2012    Hahn et al.

FOREIGN PATENT DOCUMENTS

| WO | 2011-066060 A | 6/2011 |
| WO | 2011-112312 A | 9/2011 |
| WO | 2013-048761 A | 4/2013 |

OTHER PUBLICATIONS

Ebdon et al., Polymer Degradation and Stability 69 (2000) 467-477.
Ebdon et al., Polymer Degradation and Stability 70 (2000) 425-436.
Price et al., Polymer International 49:1164-1168 (2000).
Price et al., Polymer Degradation and Stability 77 (2002) 227-233.

*Primary Examiner* — Duc Truong

(57) ABSTRACT

Polymer foam bodies are made from phosphorus-containing thermoplastic random copolymers of a dialkyl (meth)acryloyloxyalkyl phosph(on)ate. Foam bodies made from these copolymers exhibit increased limiting oxygen indices and surprisingly have good properties. In certain embodiments, the phosphorus-containing thermoplastic copolymer is blended with one or more other polymers and formed into nanofoams.

4 Claims, No Drawings

FLAME-RETARDANT COPOLYMERS OF DIALKYL (METH)ACRYLOYLOXYALKYL PHOSPHATE OR DIALKYL (METH)ACRYLOYLOXYALKYL PHOSPHONATE MONOMERS AND POLYMER FOAMS BASED MADE THEREFROM This invention was made with U.S. Government support under contract DE-EE0003916 awarded by the Department of Energy. The U.S. Government has certain rights in this invention.

This invention relates to phosphorus-containing copolymers and to foams containing those copolymers.

Extruded polymer foam boards have been used for decades as building insulation. Polystyrene boards are used most extensively, because they are inexpensive, light in weight, excellent thermal insulators and have useful physical properties. Other types of foam board insulation include rigid polyurethane and isocyanurate boards.

Polymeric foam boards are made of organic materials. With some exceptions such as phenolic types, the organic polymers in these foam boards are flammable. In order to comply with building codes, it is usually necessary to add a flame retardant when the foam boards are made.

A wide range of phosphorus-containing compounds has been suggested for use as flame retardants for organic polymers. Phosphorus-containing compounds often promote char formation when the polymer is burned. The char forms a physical barrier between the unburned portion of the polymer and the flame front. The barrier reduces the flow of fuel (the polymer itself or it thermal decomposition products) from reaching the flame and combusting.

There are several problems with known phosphorus-based flame retardants. The main problem is the large quantities needed to be effective. This is not only expensive; incorporating large amounts of phosphorus compounds leads to profound changes in the physical properties of the polymer. Low molecular weight phosphorus compounds, for example, often produce a large plasticizing effect. Solid phosphorus compounds can stiffen the polymer in undesirable ways.

Another problem with conventional phosphorus-containing flame retardants is that they can leach from the polymer during polymer processing or during use, especially if they are molecular weights below about 1000. The loss of flame retardant will of course reduce the fire performance of the polymer. In addition, the lost flame retardant can in some cases raise environmental concerns.

A third problem with using large amounts of phosphorus compounds is that they can affect the way the polymer processes, i.e., how it acts as it is fabricated into a part or body suitable for a specific application. By changing the physical, thermal and rheological characteristics of the polymer, the phosphorus compounds often greatly affect how well or easily the polymer can be formed into useful articles.

Polymer foaming processes are especially sensitive to formulation changes. Foaming processes depend on a complex mix of factors that include (among others) the degree to which the blowing agent is soluble in the polymer; the melt rheology of the polymer/blowing agent mixture, the presence or absence of materials that act as surfactants or defoamers, the presence or absence of cell nucleating agents. Additives that must be added in significant quantities, such as phosphorus-containing flame retardants, cause very significant problems in the foaming process. The cell structure is often affected in very adverse ways. This can lead, for example, to unduly large or non-uniform cell structure, high foam densities or even foam collapse, and other problems. By affecting the melt rheology of the system, the presence of the phosphorus compound may require the system to operate within very tight operating windows that are difficult to maintain in an industrial-scale foaming operation. The flame retardant can also affect the thermal conductivity of the foam.

Recently, there has developed in interest in producing so-called "nanofoams" in which the average cell size is in the range of 20 to 800 nm and preferably 50 to 300 nm. In principle, the transfer of heat through the foam by the gas molecules in the cells can be reduced very significantly if the cell size is reduced to approximately the mean free path of the gas molecules or less. (The thermal conductivity of the foam as a whole will also relate to additional factors such as the foam density, the bulk thermal conductivity of the polymer phase, the presence or absence of infrared radiation absorbers, and the like.) Some attempts to make nanofoams are described, for example, in WO 2011/066060, WO 2011/011352 and WO 2013/048761. These documents illustrate the successful production of nanofoams, but not in the presence of flame retardants or other phosphorous compounds, and therefore do not speak to the effect of flame retardants in general or phosphorus compounds in particular on the foaming process. The very high amounts of cell nucleation required to produce these nanofoams makes them very sensitive to the presence of additives, and greatly restricts the types of materials that can be incorporated into the foaming process.

It has been suggested to incorporate phosphorus into the polymer itself (rather than as an additive) by copolymerizing various phosphorus-containing monomers. A series of polymers of this type is described by John R. Ebdon et al. in, for example, *Polymer Degradation and Stability* 69 (2000) 267-277, *Polymer Degradation and Stability* 70 (2000) 425-436, *Polymer International* 40 (2000) 1164-1168 and *Polymer Degradation and Stability* 77 (2002) 227-233. These papers describe copolymers of styrene or methyl methacrylate with a series of vinyl- or (meth)acryloyloxyalkyl substituted phosphate compounds. Among these is a random copolymer of methyl methacrylate and diethyl methacryloyloxyethyl phosphate (DEMEP). As a non-cellular plaque, this copolymer exhibited a higher limiting oxygen index and more char formation than poly(methyl methacrylate) alone. No attempt to form foams from these copolymers is described.

This invention is in one aspect a polymer foam body comprising a polymeric matrix containing gas-filled cells, wherein the polymeric matrix contains a phosphorus-containing, thermoplastic random copolymer of at least one dialkyl (meth)acryloyloxyalkylphosph(on)ate and one or more comonomers, the phosphorus-containing copolymer being characterized in having a weight average molecular weight of at least 60,000 g/mol and 1.5 to 10% by weight phosphorus contributed by the dialkyl(meth)acryloyloxyalkylphosph(on)ate.

In certain preferred embodiments, the polymeric matrix further contains at least one thermoplastic, non-phosphorus-containing polymer having a glass transition temperature of at least 70° C.

The polymer foam body of the invention may be monolithic, may have an average cell size of 50 to 1000 nanometers and/or may have a porosity of at least 50%.

The invention is also a process for forming the polymer foam body, comprising

A) forming a pressurized mixture of 1) at least one blowing agent in a liquid or supercritical state, 2) a phosphorus-containing, thermoplastic random copolymer of at least one dialkyl (meth)acryloyloxyalkylphosph(on)ate and one or more comonomers, B) depressurizing the mixture whereby the blowing agent volatilizes, and the mixture expands and cools to form the polymer foam body.

As used herein, the designation (meth)acryloyl means either methacryloyl or acryloyl. Similarly, the designation (meth)acrylate means either methacrylate or acrylate. The designation (meth)acryloyloxyalkylphosph(on)ate means any of (1) an acryloyloxyalkylphosphate, (2) a methacryloyloxyalkylphosphate, (3) an acryloyloxyalkylphosphonate and (4) a methacryloyloxyalkylphosphonate. The designation (meth)acryloyloxyalkylphosphate means acryloyloxyalkylphosphate, (2) methacryloyloxyalkylphosphate. The designation (meth)acryloyloxyalkylphosphonate means acryloyloxyalkylphosphonate, (2) methacryloyloxyalkylphosphonate.

The invention is also a phosphorus-containing, thermoplastic random copolymer of a diethyl methacryloyloxyalkylphosphate wherein the alkyl is methyl or ethyl, an alkyl methacrylate and optionally one or more additional comonomers, the phosphorus-containing copolymer being characterized in having a weight average molecular weight of at least 60,000 g/mol, a glass transition temperature of at least 70° C. and 2.5 to 10% by weight phosphorus contributed by the diethyl(methacryloyloxyalkyl)phosphate.

The phosphorus-containing copolymers of the invention are easily processable into foam bodies using melt foaming methods. They can be used by themselves as the polymeric matrix of the foam body, or can be blended with one or more other polymers such as methyl methacrylate polymers and copolymers and/or styrene-acrylonitrile copolymers. The foam bodies typically have limiting oxygen indices of at least 22.

Very surprisingly, the copolymers of the invention can be processed into polymer foams having very small (less than 1000 nm) cell sizes, especially when combined with another polymer such as described more fully below.

The dialkyl (meth)acryloyloxyalkylphosphate can be generally represented by the structure:

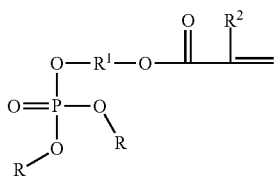

wherein each R is independently $C_1$-$C_6$ straight chain or branched alkyl, $R^1$ is $C_1$-$C_6$ linear or branched alkylene and $R^2$ is hydrogen or methyl. $R^2$ is preferably methyl. Each R is preferably methyl or ethyl. $R^1$ is preferably methylene (—$CH_2$—) or ethylene (—$CH_2$—$CH_2$—). In preferred embodiments the dialkyl (meth)acryloyloxyalkyl phosphate is a diethyl methacryloyloxyalkyl phosphate or diethyl acryloyloxyalkyl phosphate in which the alkyl group contains 1 to 6, preferably 1-2 carbon atoms. Especially preferred are diethyl methacryloyloxymethyl phosphate (DEMMP) and diethyl methacryloyloxyethyl phosphate (DEMEP), which have the structures:

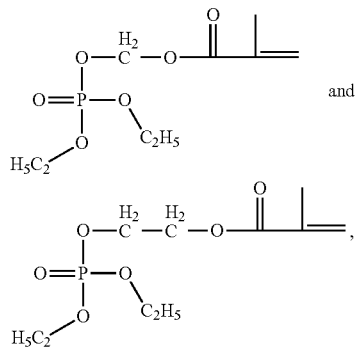

respectively.

The dialkyl (meth)acryloyloxyalkylphosphonate can be generally represented by the structure:

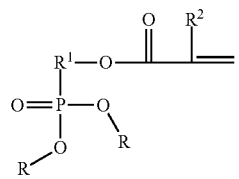

wherein R, $R^1$ and $R^2$ are as before. Examples of such a phosphonate include diethylacryloyloxymethyl phosphonate (DEAMPn) and diethyl acryloyloxyethyl phosphonate (DEAEPn), which have the structures:

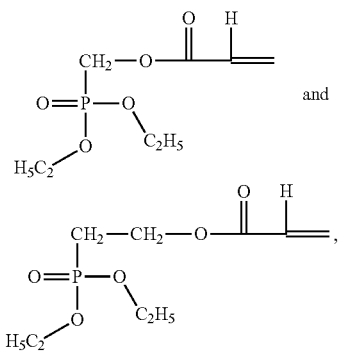

respectively.

The dialkyl (meth)acryloyloxyalkyl phosphates can be synthesized from the corresponding hydroxyalkyl (meth)acrylate and dialkyl chlorophosphate. The dialkyl (meth)acryloyloxyalkyl phosphonates can be synthesized from the corresponding (meth)acryloyl chloride and corresponding dialkyl hydroxyalkyl phosphonate. Synthetic methods are described, for example, by Ebdon et al., *Polymer Degradation and Stability* 69 (2000) 267-277.

Phosphorus-containing random copolymers of the invention are made by polymerizing a mixture of at least one dialkyl (meth)acryloyloxyalkyl phosph(on)ate with one or more comonomers.

The monomers and their proportions preferably are selected so the phosphorus-containing copolymer contains 1.5 to 10% by weight phosphorus and has a glass transition temperature of at least 60° C.

A preferred comonomer is an alkyl (meth)acrylate. The alkyl (meth)acrylate preferably is an alkyl methacrylate and more preferably is methyl methacrylate. The alkyl (meth) acrylate may constitute 20 to 85 weight percent of the monomers, preferably 35 to 75 weight percent and still more preferably 50 to 65 weight percent. Correspondingly, the phosphorus-containing copolymer may contain 20 to 85, 35 to 75 or 50 to 65 weight percent of repeating units formed by polymerizing the alkyl (meth)acrylate.

The dialkyl (meth)acryloyloxyalkyl phosph(on)ate preferably constitutes 15 to 80, more preferably 25 to 65 or even 35 to 50 weight percent of the monomers. Correspondingly, the phosphorus-containing copolymer may contain 15 to 80, 25 to 65 or 35 to 35 weight percent of repeating units formed by polymerizing the dialkyl (meth)acryloyloxyalkyl phosph (on)ate.

Other comonomers, if present at all, preferably constitute up to 30, more preferably up to 10 and still more preferably up to 5 weight percent of the monomers. Such other comonomers can be any that randomly copolymerize with the alkyl (methacrylate) (if present) and the dialkyl (meth) acryloyloxyalkyl phosph(on)ate, provided that the resulting copolymer has an amount of phosphorus and glass transition temperature as set forth herein. Examples of suitable comonomers include styrene, α-methylstyrene, 2- or 4-methylstyrene, dimethyl styrene, 2- or 4-ethylstyrene, diethylstyrene, 2- or 4-isopropylstyrene, 2- or 4-chlorostyrene, dichlorostyrene, trichlorostyrene, vinyl toluene, vinyl naphthalene, acrylic acid, methacrylic acid, methyl acrylate, butyl acrylate, ethyl acrylate, ethyl methacrylate, butyl methacrylate, hydroxyethyl acrylate, hydroxyethyl methacrylate, acrylonitrile; maleic anhydride and itaconic anhydride.

The glass transition temperature of the phosphorus-containing copolymer preferably is at least 60° C., preferably at least 70° C. and may be, for example from 70 to 150° C. or 80 to 125° C. For purposes of this invention, glass transition temperatures are measured by dynamic scanning calorimetry and are reported as the half-height of the endothermic peak.

The phosphorus-containing copolymer has a weight average molecular weight of at least 60,000, preferably at least 100,000 g/mol. The phosphorus-containing copolymer in some embodiments has a weight average molecular weight of up to 500,000, up to 300,000, up to 200,000. Unless indicated otherwise, molecular weights for purposes of this invention are measured by gel permeation chromatography relative to polystyrene standards.

The phosphorus-containing copolymer contains 1.5 to 10%, preferably 1.5 to 8%, still more preferably 3 to 8% by weight phosphorus contributed by the dialkyl (meth)acryloyloxyalkyl phosph(on)ate. Typically, all the phosphorus in the phosphorus-containing copolymer will be contributed by the dialkyl (meth)acryloyloxyalkyl phosph(on)ate monomer(s), i.e., there no other phosphorus-containing comonomers.

The phosphorus-containing copolymer is formed by polymerizing a mixture of one or more dialkyl (meth) acryloyloxyalkyl phosph(on)ate and comonomer(s) and polymerizing the mixture such that each of the monomers becomes incorporated into the resulting copolymer. A copolymer formed by the polymerization of such a monomer mixture is for purposes of this invention considered to be "random" even if the statistical distribution of the polymerized copolymers itself is not strictly random.

The polymerization can be performed as a free radical polymerization. In a free radical polymerization, the monomers are polymerized in the presence of free radicals which may be provided, for example, through the addition of a free radical initiator or by contacting the monomer mixture with ultraviolet radiation or a plasma. Free radical initiators are well known and include a variety of peroxy compounds (such as peroxides, peresters, percarbonates and the like) as well as various azo compounds. The free radical initiator may be a compound that decomposes at a temperature of, for example, 50 to 140° C. to generate free radicals. Examples of free radical initiators are azobis(isobutyronitrile), t-butyl peroxydiethylacetate, t-amyl peroxy-2-ethylhexanoate, 2,5-dimethyl-2,5-di(t-butylperoxy) hexane and the like.

Various types of controlled radical polymerization processes are also useful. A "controlled radical polymerization" is a living free-radical polymerization process characterized in that a dynamic equilibrium between propagating radicals and dormant species is established, allowing radicals to become reversibly trapped. Various types of controlled radical polymerizations are known including, for example, cobalt-mediated radical polymerization (CMPR), stable free radical mediated polymerization (SFRMP) (including, for example, a nitroxide-mediated polymerization (NMP)), atom transfer radical polymerization (ATRP) and reversible addition fragmentation chain transfer (RAFT).

The polymerization is preferably performed in solution, as this favors the production of thermoplastic copolymers. The solvent is a liquid under the conditions of the polymerization. It is a compound in which the monomers and preferably the copolymer are soluble, and which does not react under the conditions of the polymerization reaction. Examples of suitable solvents include, for example, linear and cyclic ethers such as 1,4-dioxane, esters such as ethyl acetate or butyl acetate, dimethylformamide, halogenated hydrocarbons, aromatic compounds such as toluene and xylene, and the like.

A polymer foam body according to the invention comprises a polymeric matrix containing gas-filled cells. The polymeric matrix contains the phosphorus-containing copolymer.

The polymer foam body of the invention can be made in various ways. For example, beads or other small particulates of the phosphorus-containing copolymer can be made and impregnated with a blowing agent. These beads or particulates are useful for forming polymer foam bodies according the well-known bead foaming process, in which the beads or particulates are heated, typically in a mold, to soften the copolymer and vaporize the blowing agent. The individual beads or particulates expand and fuse to form a molded or shaped body.

Alternatively, the polymer foam body can be formed using melt processing methods. In a melt processing method, a heat plasticized and pressurized mixture of the copolymer and a blowing agent is formed. The mixture is then passed to a region of reduced pressure. The blowing agent expands at the lower pressure, which causes the mixture to expand and cool to form the polymer foam body. The melt processing method can be performed batchwise, semi-continuously (as, for example, an extrusion line that feeds the heat-plasticized mixture into a mold where it expands and cools to form the foam), or a continuous melt extrusion process. A continuous melt extrusion process is especially useful for forming bodies of uniform cross-section such as foam sheet, foam boards, foam rods and the like. Foam sheet may have a thickness of, for example, 0.5 to 12.7 mm. Foam boards may have a thickness of, for example 12.7 to 305 mm, especially 25.4 to 153 mm.

Examples of useful blowing agents include, for example, carbon dioxide, water, $C_{1-6}$ linear, branched or cyclic alkanes, various fluorinated alkanes and alkenes, $C_{1-4}$ alcohols, aldehyde and ketone compounds having up to 8 carbon atoms, dialkyl ethers, alkyl carboxylates having up to 8 carbon atoms, chemical blowing agents which decompose or react to release a gas such a nitrogen or carbon dioxide. In any particular foam manufacturing process, the blowing agent or blowing agents are selected such that they have boiling temperatures below the foam processing temperature, such that they can expand the polymer and form gas-filled cells.

In making a polymer foam body in an extrusion process, various types of additives may be incorporated in the copolymer/blowing agent mixture. This include, for example, cell nucleating agents; antioxidants and/or other flame retardant synergists (such as dicumyl or polycumyl) as described, for example, in US 2011-0196053, extrusion aids, cell size control agents including polymers such as polyethylene and polyethylene wax, pigments, inorganic fillers, and infrared attenuating agents (such as carbon black, graphite and titanium dioxide). Useful stabilizers include antioxidants and acid scavengers such as magnesium oxide, epoxy resin(s), phosphite compounds and phosphate compounds. Examples of extrusion aids include plasticizers include, for example, metal salts of stearic acid such as barium stearate.

A foam body made in accordance with the invention may have a volume density of 16 to 800 kg/m$^3$. For some applications, a suitable volume density is 16 to 80 kg/m$^3$, from 24 to 60 kg/m$^3$ or from 24 to 45 kg/m$^3$.

The porosity of the foam (defined as the ratio of the volume of the voids within the foam to the total volume) is related to its volume density. The porosity may be at least 20 volume percent, at least 50 volume percent, at least 90 volume percent, at least 95 volume percent or at least 96.5 volume percent.

The foam body is in some embodiments monolithic, by which it is meant a foam having a continuous polymer phase without seams or joints between sections of the foam. A foam made in an extrusion process is monolithic in this sense.

The phosphorus-containing copolymer as described may be the only polymeric material in the polymeric matrix. Alternatively, the polymeric matrix may contain one or more additional polymers. In such a case, enough of the phosphorus-containing copolymer preferably is provided to provide the polymeric matrix with 0.5 to 10, preferably 1.5 to 8% and more preferably 3 to 5% by weight phosphorus. The weight of the polymeric matrix is considered for purposes of this invention to include the combined weight of all polymeric materials, including the phosphorus-containing copolymer and any additional polymer or polymers.

The additional polymer (or polymers) is thermoplastic and preferably has a glass transition temperature of at least 70° C., more preferably at least 90° C., still more preferably at least 95° C. The glass transition temperature in some embodiments is up to 150° C. or 130° C. The additional polymer(s) preferably are non-phosphorus containing, by which it is meant they contain less than 0.1% by weight phosphorus.

The molecular weight of such additional polymer(s) is high enough that it can form a foam body. The weight average molecular weight may be at least 30,000, at least 50,000, at least 75,000 or at least 100,000 g/mol. It may be as high as 500,000 or even more, but preferably is up to 300,000, up to 200,000 or up to 150,000.

The additional polymer(s) may be linear, long-chain branched, short-chain branched, or both long-chain and short-chain branched.

One useful type of additional polymer is poly(methyl methacrylate) or a non-phosphorus-containing copolymer of methyl methacrylate that contains at least 40 percent by weight polymerized methyl methacrylate. Such a copolymer preferably is a random copolymer. If a copolymer, the comonomer may be, for example, one or more of styrene, α-methylstyrene, 2- or 4-methylstyrene, dimethyl styrene, 2- or 4-ethylstyrene, diethylstyrene, 2- or 4-isopropylstyrene, 2- or 4-chlorostyrene, dichlorostyrene, trichlorostyrene, vinyl toluene, vinyl naphthalene, acrylic acid, methacrylic acid, methyl acrylate, n-butyl acrylate, isobutyl acrylate, t-butyl acrylate, ethyl acrylate, ethyl methacrylate, n-butyl methacrylate, isobutyl methacrylate, t-butyl methacrylate, hydroxyethyl acrylate, hydroxyethyl methacrylate, 2-(diethylamino)ethyl methacrylate, perfluorooctylethyl methacrylate, 3-(trimethyoxysilyl)propyl methacrylate, poly(ethylene glycol) methyl ether methacrylate, vinyl acetate, methacryl isobutyl POSS, methacryl isobutyl POSS, 2-ethylhexyl acrylate, vinyl fluoride, vinyltrimethoxy silane, acrylonitrile; maleic anhydride and itaconic anhydride. In some embodiments, the comonomer(s) have a solubility parameter lower than 20 (megaPascals)$^{0.5}$ and a chemical composition such that, taken together with the methyl methacrylate, twice the mass fraction of oxygen plus the mass fraction of each of nitrogen, fluorine and silicone in the monomers is greater than 0.2, as described, for example in WO 2011/11352.

Another type of additional polymer is a vinyl aromatic polymer, i.e. a polymer or copolymer of at least one vinyl aromatic monomer, having a glass transition temperature as mentioned above. A copolymer should contain at least 60% by weight polymerized vinyl aromatic monomer. Such a copolymer may be a random copolymer of one or more vinyl aromatic monomers and one or more other monomers. Examples of vinyl aromatic monomers include styrene, α-methylstyrene, 2- or 4-methylstyrene, dimethyl styrene, 2- or 4-ethylstyrene, diethylstyrene, 2- or 4-isopropylstyrene, 2- or 4-chlorostyrene, dichlorostyrene, trichlorostyrene, vinyl toluene and vinyl naphthalene. Examples of monomers that can be randomly copolymerized with styrene include acrylic acid, methacrylic acid, methyl acrylate, n-butyl acrylate, isobutyl acrylate, t-butyl acrylate, ethyl acrylate, methyl methacrylate, ethyl methacrylate, n-butyl methacrylate, isobutyl methacrylate, t-butyl methacrylate, hydroxyethyl acrylate, hydroxyethyl methacrylate, 2-(diethylamino) ethyl methacrylate, perfluorooctylethyl methacrylate, 3-(trimethyoxysilyl)propyl methacrylate, poly(ethylene glycol) methyl ether methacrylate, vinyl acetate, methacryl isobutyl POSS, methacryl isobutyl POSS, 2-ethylhexyl acrylate, vinyl fluoride, vinyltrimethoxy silane, acrylonitrile; maleic anhydride and itaconic anhydride. A preferred comonomer is acrylonitrile. Styrene-acrylonitrile copolymers containing up to 40% by weight polymerized acrylonitrile with preferred range of 10% to 35% by weight polymerized acrylonitrile are a preferred type of styrenic copolymer.

In some embodiments, the polymer matrix contains the phosphorus-containing copolymer of the invention and a polymer mixture as described in WO 2013/048761, which contains (a) at least one (meth)acrylic polymer and (b) at least one (meth)acrylic free acrylonitrile-containing copolymer.

The phosphorus-containing copolymer is useful for making nanofoams, either by itself or in a blend with one or more additional polymers as described above. Such a nanofoam is characterized by having a number average cell size of 50 to 1000 nm, determined according to the method described in WO 2013/048761. The number average cell size may be up to 800 nm, up to 650 nm, up to 500 nm, up to 300 nm or up to 250 nm. The nanofoam also preferably has a porosity of at least 30%, more preferably at least 50%, still more preferably at least 65%. The porosity of the nanofoam may be up to 85% or more. Porosity is measured according to the method described in WO 2013/048761.

A suitable method for making nanofoams is described in WO 2011/066060. In that process, nanoparticles having two orthogonal dimensions of 30 nm or less are incorporated into a melt extrusion process to produce very large numbers of nucleation cites and form the nanofoam.

The phosphorus-containing copolymer is of particular interest as a flame retardant additive for nanofoams as described in WO 2011/112352 and WO 2013/048761. The nanofoams described in these documents are made by forming a pressurized mixture of carbon dioxide (and optionally other blowing agents as describe before) and polymer. The pressure and temperature are such that the carbon dioxide is in a supercritical state and the temperature is higher than the glass transition temperature of the blowing agent/polymer mixture. Preferably, the temperature is not greater than 60° C. The mixture is then depressurized by reducing the pressure at a rate of at least 100 MPa per second, preferably at least 1 GPa per second. The pressure is in most cases reduced to the ambient atmospheric pressure. The rapid depressurization causes the mixture to expand and cools to form a polymer nanofoam body. When used in this process, the phosphorus-containing copolymer has a glass transition temperature of at least 60° C. and more preferably 70 to 120° C.

A nanofoam body made in the foregoing processes can be post-expanded by heating it to an elevated temperature such as, for example, from 40 to 85° C., as described in WO 2011/112352. This can be done, for example, by immersing the foam body in a heated liquid such as water or other non-solvent for the polymer phase.

The nanofoam also can be made in a continuous process such as described in WO 2013/048760.

The phosphorus-containing copolymer can be added in very large amounts to certain other polymers to produce nanofoams in this process. The other polymer may be, for example, poly(methyl methacrylate) or a non-phosphorus-containing copolymer of methyl methacrylate and one or more comonomer(s) that have a solubility parameter lower than 20 (megaPascals)$^{0.5}$ and a chemical composition such that, taken together with the methyl methacrylate, twice the mass fraction of oxygen plus the mass fraction of each of nitrogen, fluorine and silicone in the monomers is greater than 0.2, as described in WO 2011/11352. Such methyl methacrylate copolymer may be a methyl methacrylate/ethyl methacrylate copolymer containing 40 weight percent or more polymerized methyl methacrylate; a methyl methacrylate/ethyl acrylate copolymer containing 80 weight percent or more polymerized methyl methacrylate; a methyl methacrylate/vinyl acetate copolymer containing 80 weight percent or more of polymerized methyl methacrylate; a methyl methacrylate/vinyl acetate/ethyl acetate terpolymer containing 80 weight percent or more polymerized methyl methacrylate; a methyl methacrylate/ethyl methacrylate/ethyl acrylate terpolymer containing 40 weight percent or more polymerized methyl methacylate; a methyl methacrylate/n-butyl methacrylate copolymer containing 80 weight or more polymerized methyl methacrylate; or a methyl methacrylate/ butyl methacrylate/ethyl acrylate terpolymer containing 80 weight percent or more polymerized methyl methacrylate.

The other polymer used in the nanofoam process described above may be a non-phosphorus-containing styrene-acrylonitrile copolymer having a glass transition temperature of at least 95° C.

The other polymer used in the nanofoam process described above may be a polymer mixture as described in WO 2013/048761, i.e., a polymer mixture which contains (a) at least one (meth)acrylic polymer and (b) at least one (meth)acrylic free acrylonitrile-containing copolymer. The (meth)acrylic free acrylonitrile-containing copolymer should have a higher glass transition temperature than the (meth)acrylic polymer. Each should have a glass transition temperature of at least 75° C. and preferably at least 95° C., but preferably no greater than 150° C. The (meth)acrylic polymer may be, for example, poly(methyl methacrylate), poly(ethyl methacrylate) or a copolymer of methyl methacrylate and/or ethyl methacrylate with one or more comonomers such as methyl acrylate, ethyl acrylate, butyl acrylate, butyl methacrylate, acrylic acid, vinyl acetate, acrylonitrile, vinyl diaminotriazine, acrylamide, styrene, isoprene, butadiene, vinyl fluoride, vinyl chloride and the like. The (meth)acrylic free acrylonitrile-containing copolymer preferably is a styrene-acrylonitrile or styrene-butadiene-acrylonitrile containing 4 to 40% polymerized acrylonitrile.

Foam according to the invention exhibits flame resistant properties. The foam typically exhibits a limiting oxygen index (LOI) of at least 22, it being understood that LOI values will depend at least partially on the amount of phosphorus provided to the foam by the phosphorus-containing copolymer. In some embodiments, the LOI is 22 to 28.

Foam made according to the invention is useful as a thermal insulating material in a wide variety of applications. It can be formed into ice chests or small coolers, as insulation for thermoses, ice chests or coolers, as foam insulation board for housing and other construction, and the like.

The following examples are provided to illustrate the invention but are not intended to limit the scope thereof. All parts and percentages are by weight unless otherwise indicated.

EXAMPLE 1 AND FOAM EXAMPLES F-1 TO F-5

2-hydroxyethyl methacrylate (13 g), triethylamine (12.3 g) and copper (I) chloride (0.15 g) are dissolved in 55 mL diethyl ether, cooled in an ice bath and purged with nitrogen. Diethylphosphorochloridate (17.25 g) is added dropwise over 1.5 hours. The mixture is then stirred at about 0° C. for one hour, and then stirred at room temperature for two days. Precipitated triethylamine monochloride is removed by filtration. The solvent is then removed by rotary evaporation to yield 21.5 g of diethyl methacryloyloxyethyl phosphate (DEMEP) as a pale yellow liquid. The crude product is purified by column chromatography using a silica gel medium and a mixture of hexane and ethyl acetate as the eluent. The final product purity is about 98% by gas chromatography and $^{31}$P NMR.

A phosphorus-containing copolymer (Example 1) of DEMEP and methyl methacrylate is made by mixing 45.6 parts of methyl methacrylate, 34.4 parts of DEMEP, 0.4 parts of azodiisobutyronitrile and 80 mL dioxane. The mixture is stirred at room temperature under nitrogen and then heated to 70° C. for 24 hours. The mixture is cooled and the copolymer is recovered by precipitation into 300 mL diethyl ether followed by filtration. The product is reprecipitated several times to remove residual monomer and dried under vacuum at room temperature for 24 hours. The resulting product has a weight average molecular weight of 155,000 g/mol. It contains 4.8% by weight phosphorus and has a glass transition temperature of 73° C. Yield is >95%, which indicates that the polymer is substantially non-cross-linked.

Portions of copolymer Example 1 are separately blended with a methyl methacrylate/ethyl acrylate (91:9 weight ratio) random copolymer that has a glass transition temperature of about 102° C., by melting the polymers together in a Haake blender. The weight ratios of the starting polymers and amount of phosphorus in the blends are as indicated in Table 1 below. The samples are designated F-1 through F-4. 100 mm×6.5 mm×1.5 m plaques are made from the blends and tested for LOI according to ASTM D2863, with results as indicated in Table 1.

Portions of the polymer blends are charged into a 50 mL high pressure cylindrical vessel, melted and pressurized for two hours with carbon dioxide. Pressure and temperature conditions are as indicated in Table 1. The vessel is then depressurized at a rate of about 2 GPa per second. The polymer/carbon dioxide mixture depressurizes and expands to form a foam. If indicated in Table 1, the foam sample is then post-expanded by immersing in 60° C. water for 3 minutes. The glass transition temperature of the foam is measured by differential scanning calorimetry and cell size and porosity measured according to the methods described in WO 2013/48761. Results are as reported in Table 1.

TABLE 1

| Condition/Property | Example No. | | | |
|---|---|---|---|---|
| | F-1 | F-2 | F-3 | F-4 |
| % Phosphorus in DEMEP copolymer | 4.8 | 4.8 | 4.8 | 4.8 |
| DEMEP copolymer $T_g$, ° C. | 73 | 73 | 73 | 73 |
| % DEMEP in polymer blend | 62.5 | 62.5 | 38.5 | 62.5 |
| % Phosphorus in polymer blend | 3 | 3 | 1.8 | 3 |
| $T_g$, polymer blend, ° C. | 98/76 | 98/76 | 98/75 | 98/76 |
| LOI, polymer blend (plaques) | 22 | 22 | 20.5 | 22 |
| Cell size, nm | 670 | 250 | 530 | 310 |
| Foam porosity, % | 75 | 65 | 73 | 75 |
| $CO_2$ soak temperature, ° C. | 35 | 30 | 30 | 35 |
| $CO_2$ soak pressure, MPa | 30 | 33 | 33 | 30 |
| Post expansion | Yes | Yes | Yes | No |

As can be seen from the data in Table 1, nanofoams are successfully made using large (38.5-62.5 wt-%) proportions of the DEMEP copolymer. LOI is 20.5 for the sample containing only 1.8% phosphorus and 22 in all cases when the phosphorus content is 3%. The LOI values are on non-cellular plaques and are predictive of LOI values of 22-28 for foams.

The polymeric matrix exhibits two glass transition temperatures, once corresponding closely to that of the methyl methacrylate/ethyl acrylate copolymer and one corresponding closely to that of the DEMEP copolymer. This indicates that the two copolymers do not dissolve in one another at the tested proportions, which is further indicated by the hazy appearance of the plaques made from the blends.

Another blend (Example F-5) of the DEMEP copolymer is made in the same manner. The second polymer in this case is a styrene-acrylonitrile random copolymer containing 28% polymerized acrylonitrile. The blend is foamed and evaluated as before. Results are as indicated in Table 2:

TABLE 2

| Condition/Property | Example F-5 |
|---|---|
| % DEMEP in polymer blend | 62.5 |
| % Phosphorus in polymer blend | 3 |
| $T_g$, polymer blend, ° C. | 101/81 |
| LOI, polymer blend | 22 |
| Cell size, nm | 363 |
| Foam porosity, % | 68 |
| $CO_2$ soak temperature, ° C. | 35 |
| $CO_2$ soak pressure, MPa | 30 |
| Post expansion | No |

The DEMEP also forms a nanofoam when blended with the styrene-acrylonitrile copolymer.

EXAMPLE 2

A DEMEP copolymer is prepared in the general manner described in Example 1, except the ratios of monomers are changed. This copolymer contains 7.8% phosphorus, has a weight average molecular weight of 150,000 g/mol and has a glass transition temperature of 17° C. This DEMEP copolymer is blended with the random methyl methacrylate/butyl acrylate copolymer described in Example 1 to produce a blend containing 3% phosphorus. The blend exhibits a glass transition temperature at 17° C. and another one at 98° C., corresponding to those of the two polymeric components. A foam is made from this blend in the manner described with respect to Example F1 above. This foam has an average cell size of 1900 nm and a porosity of 71%.

EXAMPLE 3

Diethyl hydroxymethyl phosphonate (118 g) and triethylamine (98 mL) are dissolved in 400 mL anhydrous dichloromethane, cooled in an ice bath and purged with nitrogen. Acryloyl chloride (56.9 g) in 10 mL dichlormethane is added dropwise. The mixture is then stirred at about 0° C. for three hours, and then stirred at room temperature for 24 hours under nitrogen. Precipitated triethylamine monochloride is removed by filtration. The solvent is then removed by rotary evaporation. Phenothiazine (400 mg) and hydroquinone (350 mg) are added. The product is distilled at 108° C. under vacuum to yield 109.6 g of diethylacryloyloxymethyl phosphonate (DEAMPn) as a colorless liquid. The final product purity is about 98% by gas chromatography and $^{31}P$ NMR.

A portion of the DEAMPn is copolymerized with methyl methacrylate in the general manner described in Example 1, to produce a phosphorus-containing random copolymer having a molecular weight of 190,000 g/mol, 6.5% phosphorus and a glass transition temperature of 30° C. This DEAMPn copolymer is blended with the methyl methacrylate/ethyl acrylate copolymer described in previous examples to from a blend containing 3% phosphorus. This blend has glass transition temperatures of 102 and 30° C., corresponding to those of the individual copolymers. The LOI is 23.5%. When foamed in the same manner as Example 2, the resulting foam has a cell size of 800-8000 nm (2300 nm average) and a porosity of 22%.

EXAMPLE 4

2-hydroxyethyl acrylate (11.6), triethylamine (10.4 g) and copper (I) chloride (0.14 g) are dissolved in 55 mL diethyl ether, cooled in an ice bath and purged with nitrogen. Diethylphosphorochloridate (17.25 g) is added dropwise over 1.5 hours. The mixture is then stirred at about 0° C. for one hour, and then stirred at room temperature for two days. Precipitated triethyamine monochloride is removed by filtration. The solvent is then removed by rotary evaporation to yield 18.7 g of diethyl acryoyloxyethyl phosphate (DEAEP) as a pale yellow liquid. The crude product is purified by column chromatography using a silica gel medium and a mixture of hexane and ethyl acetate as the eluent. The final product purity is about 95% by gas chromatography and $^{31}$P NMR.

A portion of the DEAEP is copolymerized with methyl methacrylate in the general manner described in Example 1, to produce a phosphorus-containing random copolymer having a molecular weight of 253,000 g/mol, 7.5% phosphorus and a glass transition temperature of −7° C. This DEAEP copolymer is blended with the methyl methacrylate/ethyl acrylate copolymer described in previous examples to from a blend containing 3% phosphorus. This blend has glass transition temperatures of 96 and −7° C., corresponding to those of the individual copolymers. The LOI is 23.5%. When foamed in the same manner as Example 2, the resulting foam has a cell size of 1900 nm and a porosity of 63%.

What is claimed is:

1. A polymer foam body comprising a polymeric matrix containing gas-filled cells, the foam body having a porosity of at least 50% and a number average cell size of 50 to 1000 nm, wherein the polymeric matrix comprises A) a phosphorus-containing, thermoplastic random copolymer of at least one dialkyl (meth)acryloyloxyalkylphosph(on)ate and one or more comonomers, the phosphorus-containing copolymer being characterized in having a glass transition temperature of 70 to 150° C., a weight average molecular weight of at least 60,000 g/mol and 3 to 8% by weight phosphorus contributed by the dialkyl(meth)acryloyloxyalkylphosph(on)ate and B) at least one thermoplastic poly(methyl methacrylate) or thermoplastic non-phosphorus-containing copolymer of methyl methacrylate in which the comonomer(s) have a solubility parameter lower than 20 (megaPascals)$^{0.5}$ and the chemical composition of the non-phosphorus-containing copolymer is such that twice the mass fraction of oxygen plus the mass fraction of each of nitrogen, fluorine and silicone in the monomers is greater than 0.2, and wherein the foam body contains 2.5 to 5% by weight phosphorus contributed by the dialkyl(meth)acryloyloxyalkylphosph(on)ate.

2. The polymer foam body of claim 1, wherein the diethyl(meth)acryloyloxyalkyl phosphate is diethylmethacryloyloxymethyl phosphate or diethylmethacryloyloxyethyl phosphate.

3. The polymer foam body of claim 1, wherein the comonomer(s) of the phosphorus-containing, thermoplastic random copolymer of at least one dialkyl (meth)acryloyloxyalkylphosph(on)ate include at least one alkyl (meth) acrylate.

4. The polymer foam body of claim 3, wherein the alkyl (meth)acrylate is methyl methacrylate.

* * * * *